United States Patent
Malkin

(10) Patent No.: US 8,301,894 B2
(45) Date of Patent: Oct. 30, 2012

(54) METHOD AND APPARATUS FOR APPLYING DIGITAL SIGNATURES TO TRANSLATED CONTENT

(75) Inventor: Wayne Malkin, Alberta (CA)

(73) Assignee: International Business Machines Corporation, Armonk, NY (US)

( * ) Notice: Subject to any disclaimer, the term of this patent is extended or adjusted under 35 U.S.C. 154(b) by 1253 days.

(21) Appl. No.: 11/972,519

(22) Filed: Jan. 10, 2008

(65) Prior Publication Data

US 2009/0183006 A1 Jul. 16, 2009

(51) Int. Cl.
*H04L 29/06* (2006.01)
(52) U.S. Cl. .................. 713/176; 713/161; 713/180
(58) Field of Classification Search ............. 713/161, 713/176, 180
See application file for complete search history.

(56) References Cited

U.S. PATENT DOCUMENTS

| | | | |
|---|---|---|---|
| 5,661,805 A * | 8/1997 | Miyauchi ................ | 713/176 |
| 5,864,855 A * | 1/1999 | Ruocco et al. ............ | 1/1 |
| 6,028,938 A * | 2/2000 | Malkin et al. ............ | 713/176 |
| 6,848,048 B1 * | 1/2005 | Holmes .................... | 713/162 |
| 6,938,014 B1 * | 8/2005 | Fenton ..................... | 705/50 |
| 7,506,175 B2 * | 3/2009 | Baentsch et al. .......... | 713/187 |
| 7,539,869 B1 * | 5/2009 | Mullan et al. ............. | 713/176 |
| 7,627,765 B2 * | 12/2009 | Nakamura et al. ........ | 713/181 |
| 7,770,015 B1 * | 8/2010 | Goldman et al. .......... | 713/176 |
| 2005/0165671 A1 * | 7/2005 | Meade et al. .............. | 705/37 |
| 2006/0095774 A1 * | 5/2006 | Butterfield et al. ....... | 713/176 |
| 2007/0220260 A1 * | 9/2007 | King ......................... | 713/176 |
| 2008/0022128 A1 * | 1/2008 | Proudler et al. ........... | 713/189 |
| 2008/0072334 A1 * | 3/2008 | Bailey et al. .............. | 726/28 |
| 2008/0133925 A1 * | 6/2008 | Abe et al. .................. | 713/176 |

* cited by examiner

*Primary Examiner* — Haresh N Patel
*Assistant Examiner* — Chau Le
(74) *Attorney, Agent, or Firm* — Patterson & Sheridan, LLP

(57) ABSTRACT

A method (100) and a system (300) for applying digital signatures (206, 216, and 222) to translated content (and other content) can include a presentation (309) and a user interface presented on the presentation device. The system can further include at least one processor (307) that operates to create (102) the user interface in a first language as part of an application, enables (104) the entering of data into the user interface and the digital signing of the data by a first user, translates (106) the user interface to at least a second language, and presents (108) the data to at least a second user using the application. A recipient device can verify (110) the digital signatures where a verification of the digital signatures independently verifies a data signature (222), a user interface signature (206), and a translated user interface signature (216).

18 Claims, 10 Drawing Sheets

AUTHOR SOURCE UI

400

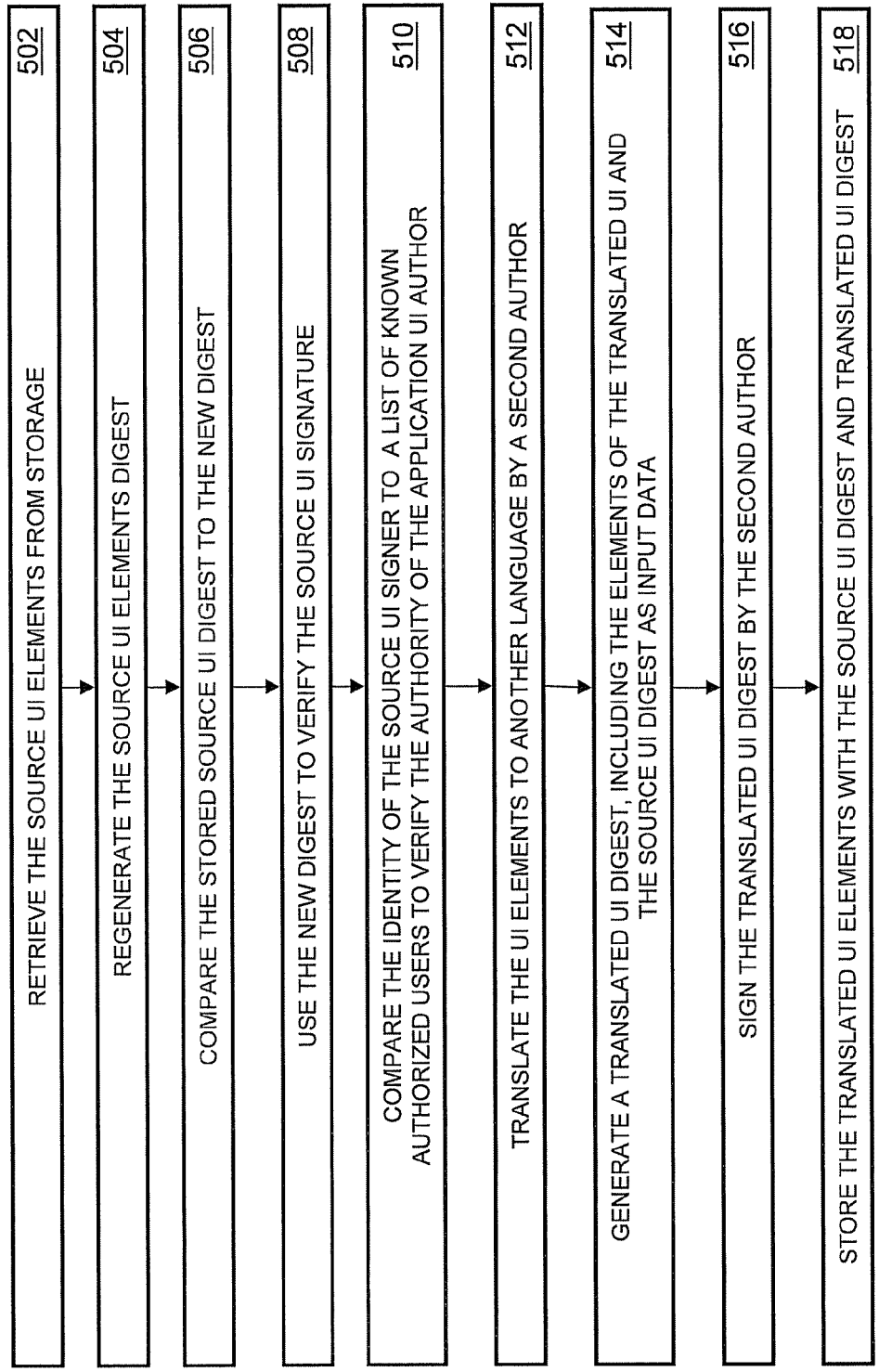

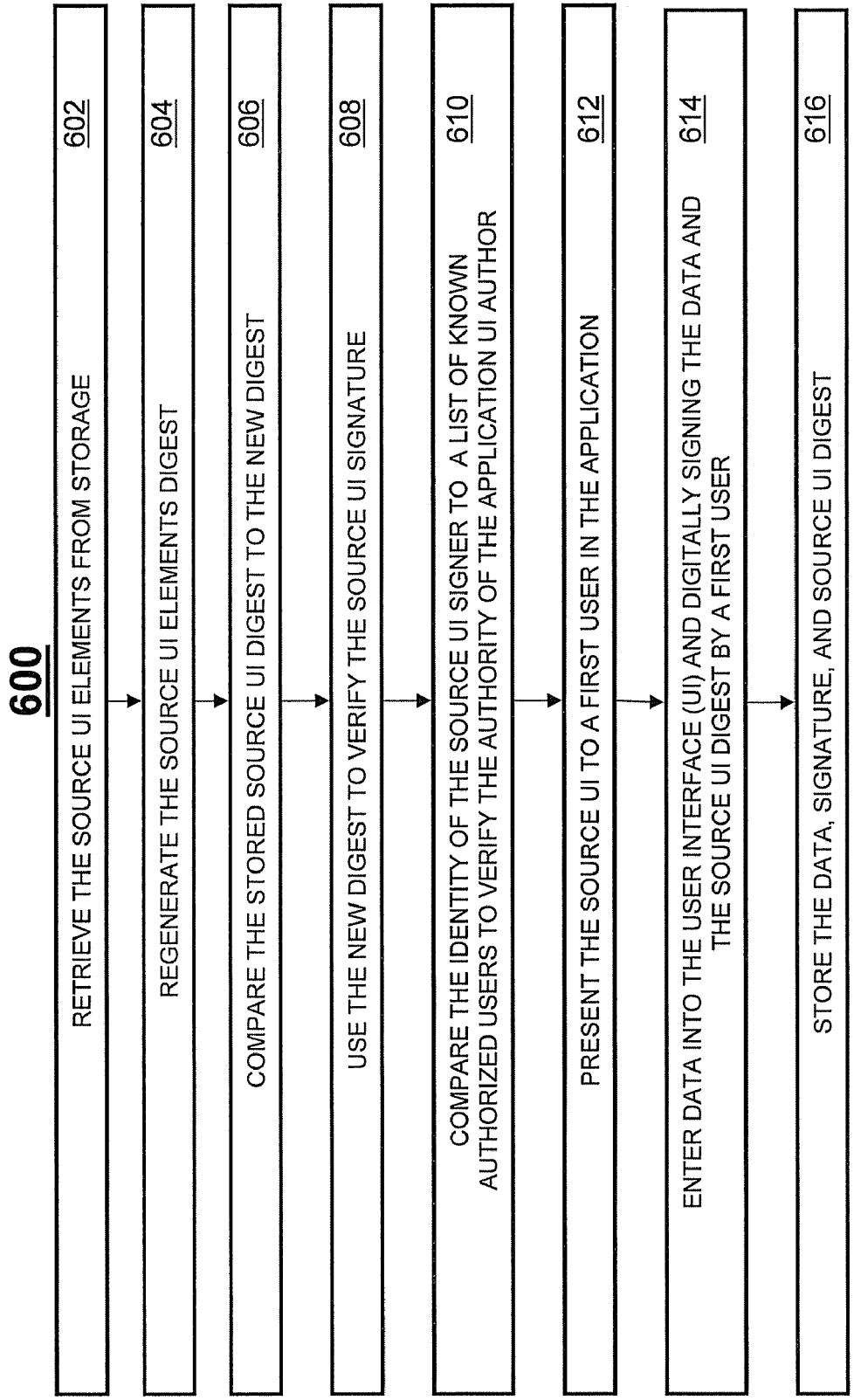

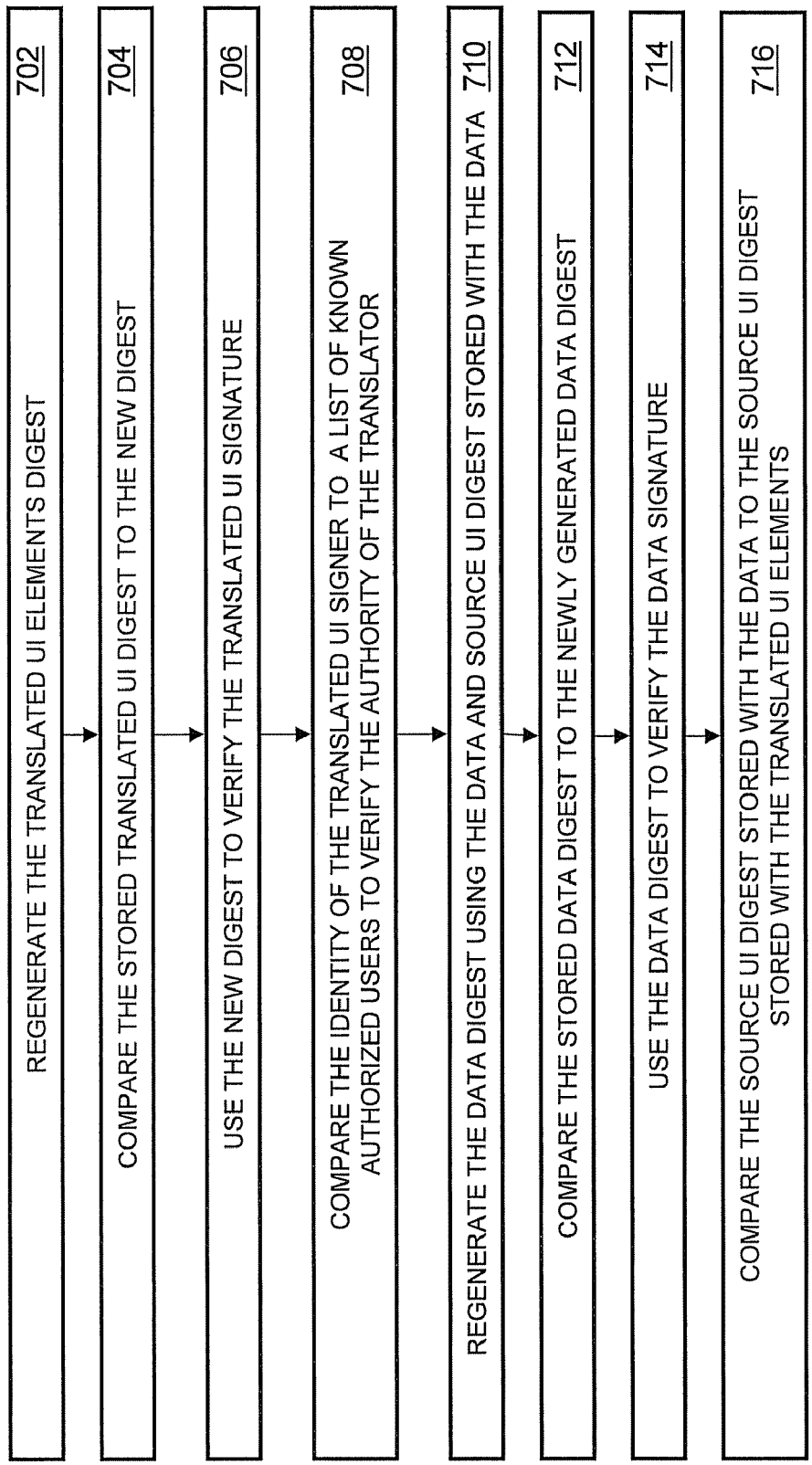

FIG. 7

VERIFY DATA IN TRANSLATED UI
700

702 REGENERATE THE TRANSLATED UI ELEMENTS DIGEST

704 COMPARE THE STORED TRANSLATED UI DIGEST TO THE NEW DIGEST

706 USE THE NEW DIGEST TO VERIFY THE TRANSLATED UI SIGNATURE

708 COMPARE THE IDENTITY OF THE TRANSLATED UI SIGNER TO A LIST OF KNOWN AUTHORIZED USERS TO VERIFY THE AUTHORITY OF THE TRANSLATOR

710 REGENERATE THE DATA DIGEST USING THE DATA AND SOURCE UI DIGEST STORED WITH THE DATA

712 COMPARE THE STORED DATA DIGEST TO THE NEWLY GENERATED DATA DIGEST

714 USE THE DATA DIGEST TO VERIFY THE DATA SIGNATURE

716 COMPARE THE SOURCE UI DIGEST STORED WITH THE DATA TO THE SOURCE UI DIGEST STORED WITH THE TRANSLATED UI ELEMENTS

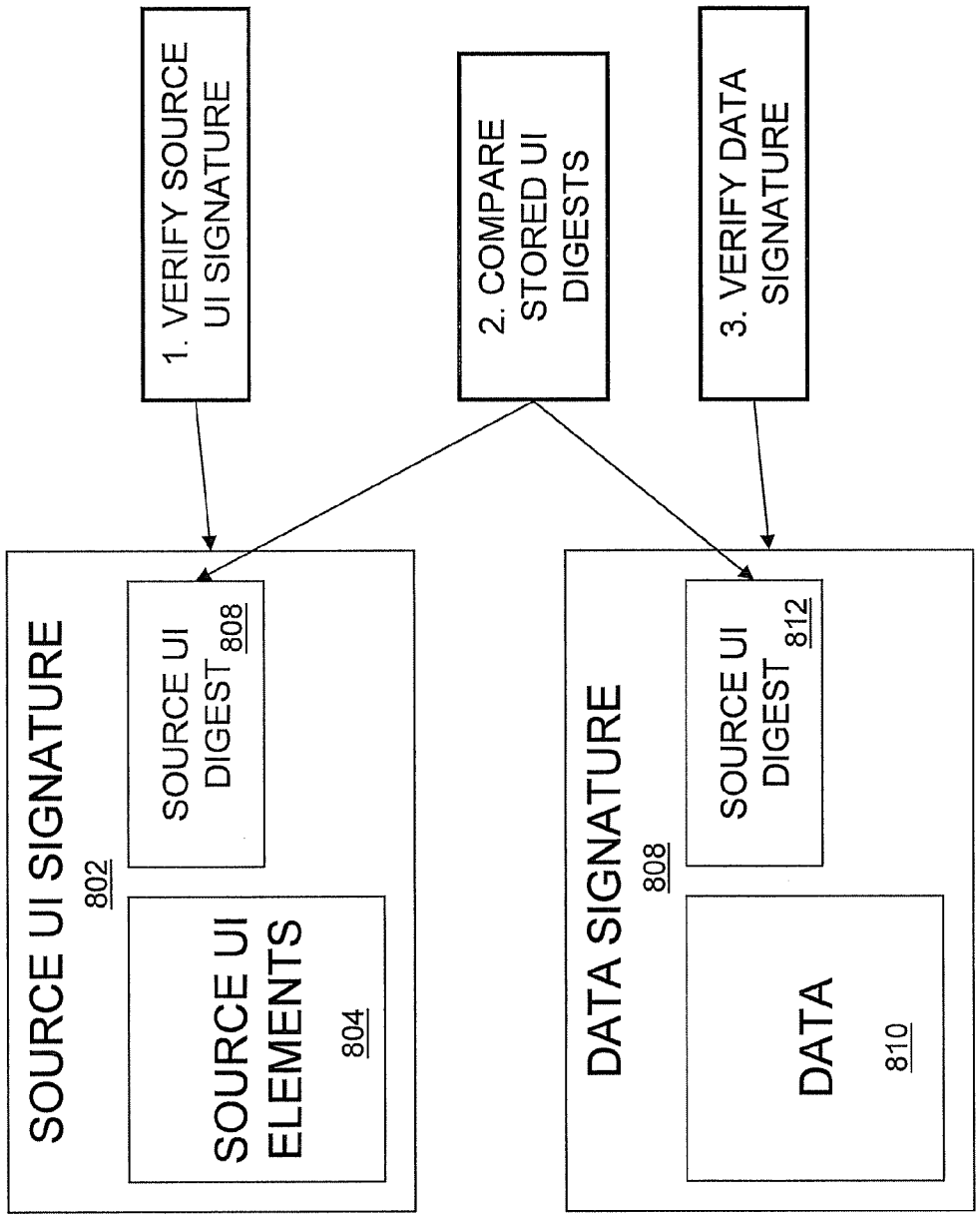

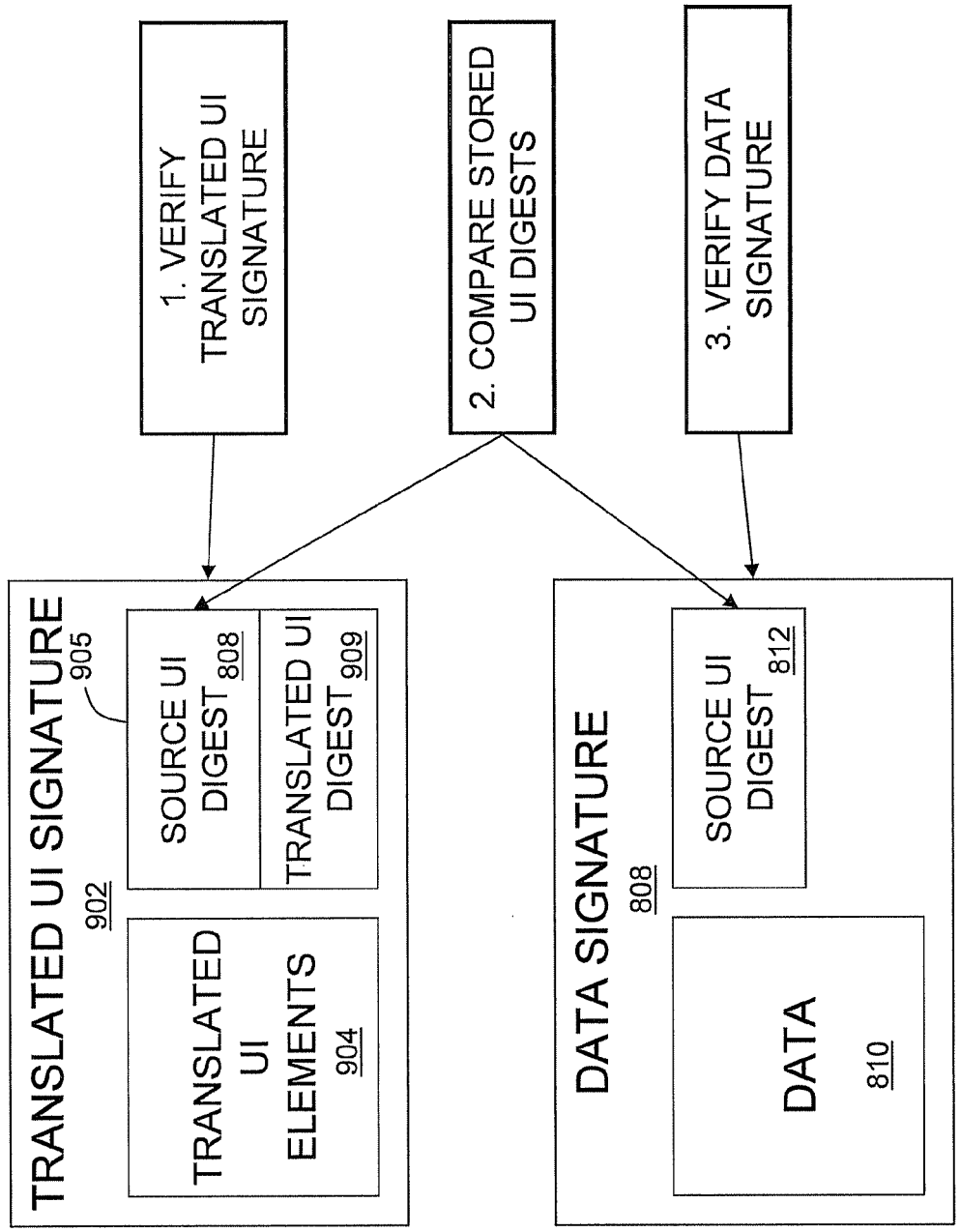
FIG. 9 – CHAIN OF TRUST FOR MIXED UI
1. DATA WAS SIGNED IN SOURCE UI
2. DATA WAS VERIFIED IN TRANSLATED UI

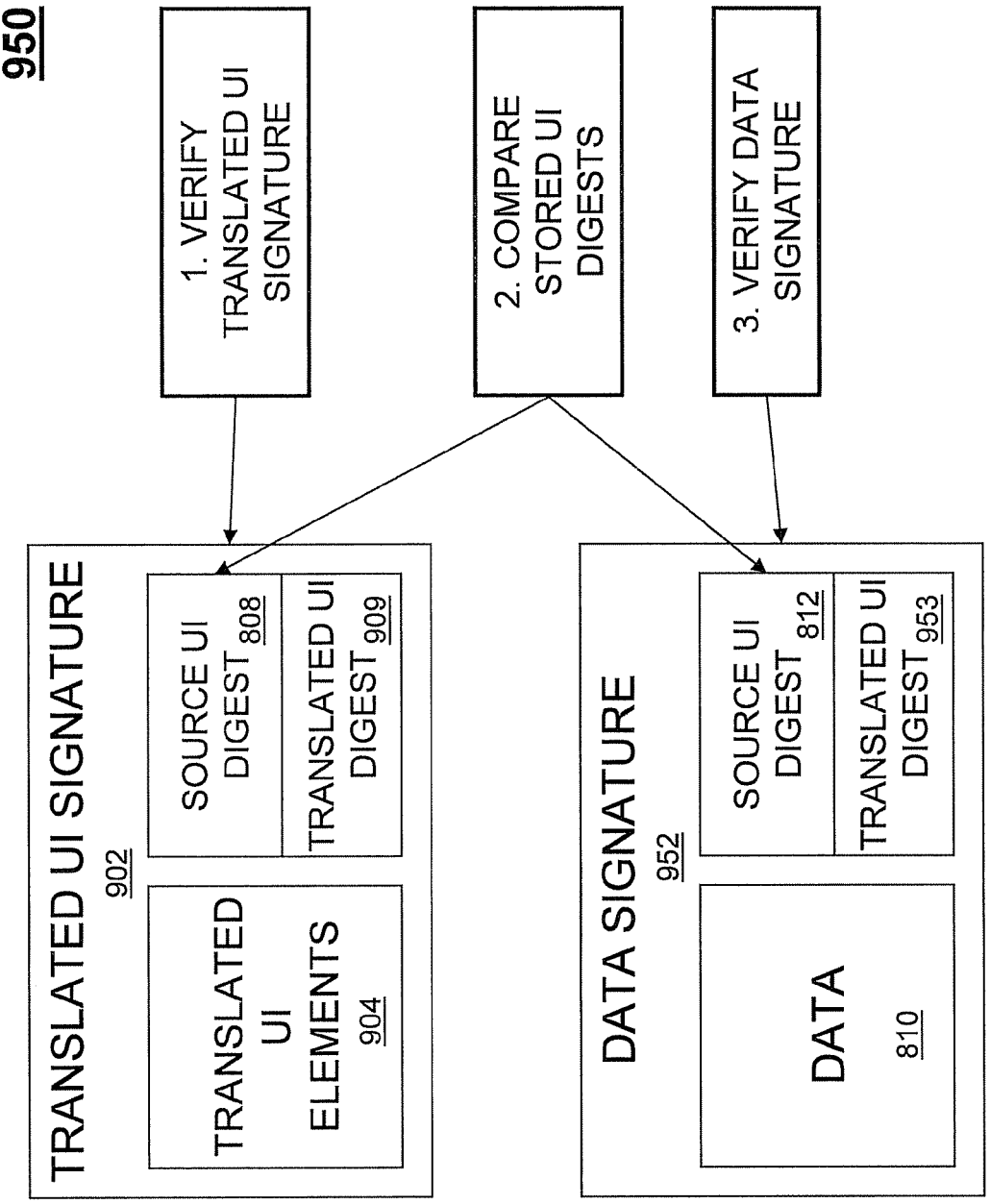

METHOD AND APPARATUS FOR APPLYING DIGITAL SIGNATURES TO TRANSLATED CONTENT

FIELD OF THE INVENTION

The present invention relates to the field of encryption and, more particularly, to a method, system and apparatus that applies digital signatures to translated content.

BACKGROUND

Digital signatures are often applied to transactional content where the presentation of the content is a critical aspect. For example, an electronic form presents data to the user within a specific context, such as a boolean value (for example, "Yes/No") being presented in a labeled field (Smoker) on an application for insurance. The context and presentation of the data is every bit as critical as the data itself, and so digital signatures must consider all aspects of the user's interpretation. One solution to this problem is to simply apply signatures to the entire presentation including applying signatures to data, field labels, and so on. This approach is very limited when translated content is considered. Existing systems or methods have not contemplated or considered what should a signature encapsulate in cases where the signer is viewing a first translation (for example, an English translation) of the form, but a later consumer of the data is viewing a second translation (for example, a French or Japanese translation) of the form. A new approach for applying digital signatures to translated content is needed.

SUMMARY

In a first aspect in accordance with an embodiment herein, a method of applying digital signatures to translated content can include the steps of creating a user interface (UI) in a first language as part of an application, entering data into the user interface and digitally signing the data by a first user, translating the user interface to a second language, and presenting the data to a second user in the application and verifying the signature, where a signature for translated user interface or a translated user interface digest is independently verified.

In another aspect in accordance with an embodiment herein, a system for applying digital signatures to translated content can include a presentation device, a user interface presented on the presentation device, and at least one processor. The processor can be programmed or otherwise operate to create the user interface in a first language as part of an application, enable the entering of data into the user interface and the digital signing of the data by a first user, translate the user interface to at least a second language, present the data to at least a second user using the application, and verify the digital signatures. A verification of the digital signatures verifies a data signature, a user interface signature, and a translated user interface signature.

It should be noted that various aspects of the invention can be implemented as a program for controlling computing equipment to implement the functions described herein, or a program for enabling computing equipment to perform processes corresponding to the steps disclosed herein. This program may be provided by storing the program in a magnetic disk, an optical disk, a semiconductor memory, any other recording medium, or can also be provided as a digitally encoded signal conveyed via a carrier wave. The described program can be a single program or can be implemented as multiple subprograms, each of which interact within a single computing device or interact in a distributed fashion across a network space.

BRIEF DESCRIPTION OF THE DRAWINGS

There are shown in the drawings, embodiments which are presently preferred, it being understood, however, that the invention is not limited to the precise arrangements and instrumentalities shown.

FIG. 5 is a flow chart illustrating a method of digitally signing a translated user interface in accordance with an embodiment of the present invention.

FIG. 6 is a flow chart illustrating a method of signing data in the source user interface in accordance with an embodiment of the present invention.

FIG. 7 is a flow chart illustrating a method of verifying data in a translated user interface in accordance with an embodiment of the present invention.

FIG. 8 is a block diagram representing a chain of trust for an original or source user interface in accordance with an embodiment of the present invention.

FIG. 9 is a block diagram representing a chain of trust for a mixed user interface in accordance with an embodiment of the present invention.

FIG. 10 is a block diagram representing a chain of trust for a translated user interface in accordance with an embodiment of the present invention.

DETAILED DESCRIPTION

Embodiments in accordance with the invention can resolve several problems that can exist with translated UIs or other translated content. The UI (or presentation) can be used to ensure non-repudiation of signatures applied to data, as an assertion that the UI looked different can cast doubt on the legality of the signature. Signing a UI directly or solely can be considered a limiting factor as the data can then only be viewed in the same language. Signing the UI and data separately does not in and of itself solve the non-repudiation problem, as it is possible to assert that a different UI must have been presented. A UI digest as further detailed below can solve the non-repudiation problem presented since it is reproducible, and cryptographically sound (there is a vanishingly small chance of two different but valid UIs producing the same digest). Furthermore, the UI digest provides a link between all of the elements.

A second aspect is that the signatures applied to the various UI translations should be from trusted and authorized individuals. In other words, it is still possible to subvert a system by a rogue user creating a new translated UI, signing it, and somehow causing it to be unknowingly used by another party to generate data signatures. For this reason, it may be preferable in some implementations to store the entire UI signature block as well as the digest. This would allow the identity of the UI signer(s) and certificate issuer(s) to be determined in a later audit, and for subversions to be uncovered.

Figure 1:
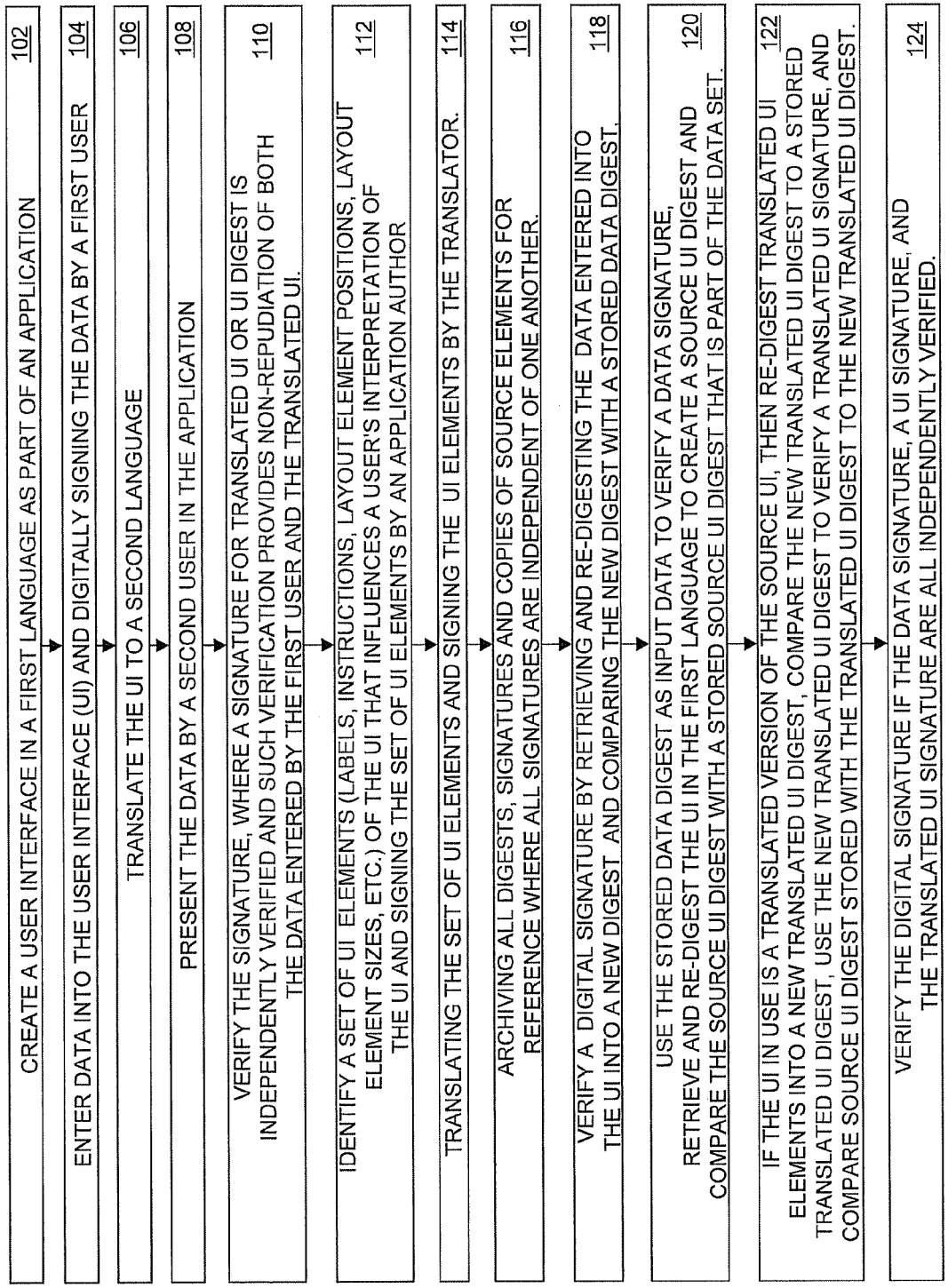
FIG. 1 is a flow chart illustrating a method of digitally signing translated content in accordance with an embodiment of the present invention.

With reference to FIG. 1, a method 100 of applying digital signatures to translated content can involve the step 102 of creating a user interface as part of an application, the step 104 of entering data into the user interface and digitally signing for the data by the user, and translating the user interface at step 106. The method can further include presenting or displaying the data at step 108 by a second user in the application and verifying the signature at step 110 where the user interface has been translated to another language. Embodiments described herein include a method for digitally signing aspects of the user interface such that the digital signature created in at step 104 and verified at step 110 provides non-repudiation of both the data entered by the user, and the user interface surrounding that presentation, despite the fact that the user interface was translated to another language, and thus could not be directly included in the digital signature digest. Note that the user interface translation (106) may be performed before or after the application was deployed. Additional transactions may be added at any time. Further note that signatures may be verified in the context of translated user interfaces that were deployed after the creation of the digital signature.

Referring again to FIG. 1, the step 102 of creating the user interface for an application can be created using any appropriate mechanism. Elements of the user interface that influence the user's interpretation of that interface can be identified at step 112. For example, labels, instructions and interpretation, as well as important layout information such as position and size of elements, where that information may influence the user's understanding or interpretation can be considered User Interface (UI) elements. In other words, any element of the UI that affects how a user will interpret data within the UI should be identified. This collection of UI elements can then signed by the application author as noted in step 112. The process of signing can include the generation of a cryptographic digest. The digest is stored, and the signature is applied to the digest.

The user interface can be translated and signed. For example, a translator (see 305 in FIG. 3) can translate the user interface created at step 102 and more particularly can translate UI elements to another language. Modifications to the layout may be necessary to accommodate larger strings in another language. Once translated at step 114, the collection of UI elements can be digested and signed by the translator. The digest of the original (source) UI elements can be included in the set of translated UI elements in order to provide traceability of the translation. The digest of the translated UI can be stored, and digitally signed.

Figure 2:
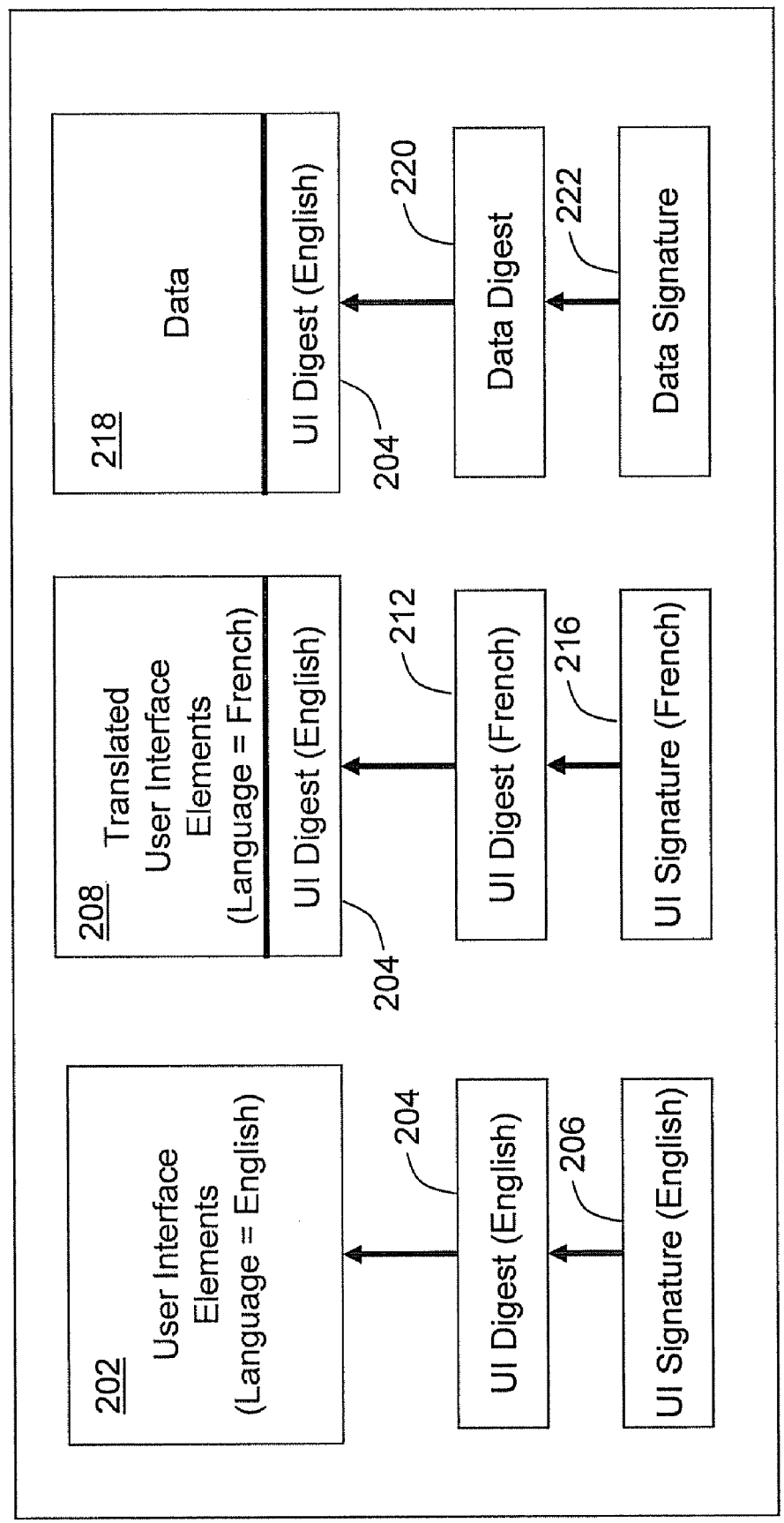
FIG. 2 is a schematic representation of a signed user interface, signed translated user interface and signed data in accordance with an embodiment of the present invention.

At step 116, all of the digests, signatures, and optionally copies of the source elements can be archived for later reference. Ideally all these elements can be stored in a content management system where they could be reliably retrieved later, and where versioning can be applied to facilitate revisions after initial system. All of the signatures are independent of one another. No signature depends on or signs another signature. Digests of content can be copied into later content as elements. As shown in the system 200 of FIG. 2, a UI signature 206 in a source language (such as English) can sign a UI digest 204 for a set of UI elements in the source language. Likewise and independently, a UI signature 216 in a second language (such as French) can sign a UI digest 212 for a set of translated UI elements 208 in the second language. As noted above, digests of content can be copied into later content as elements. In this instance, the UI digest 204 in the source language is copied and included with the translated UI elements 208. A data signature 222 also independently signs a data digest 220 for the data 218 entered in the user interface. As in the translated UI elements 208, the data 218 can include a copy of the UI digest 204 of the source.

Regarding step 104, an end user of the system enters information into the user interface. Once the data has been entered, it can be digitally signed. The data can also be digested, along with the digest of the UI elements in the source language, and optionally the digest of the UI elements in the language employed by the user. This provides traceability of the UI elements at the time of signing by the end user.

At step 118, a downstream user can verify the data signature by retrieving and re-digesting the data entered into the UI into a new digest and comparing the new digest with a stored data digest. A downstream user views the UI with embedded data and can choose to verify the embedded digital signature. The verification procedure in one particular embodiment can follow these steps:

a) The data is re-digested. Part of the data can be a copy of the UI digest, which was copied into the data set in step 104.

b) The new digest can be compared to the stored data digest at step 118.

c) The data signature can be verified at step 120, using the data digest as input data.

d) The source user interface can be retrieved, and re-digested.

e) The source UI digest is compared to the stored source UI digest that is part of the data set.

f) At step 122, if the UI in use is a translated version of the source UI, then the translated UI elements are re-digested where one of the translated UI elements is a copy of the source UI digest. The new translated UI digest can be compared to the stored translated UI digest and the translated UI signature is verified using the new translated UI digest. The source UI digest that is stored with the translated UI is compared to the source UI digest that was retrieved and re-digested. At step 124, if all of these verifications are successful, then the signature is verified.

The embodiments described above can generally be applied to any user interface combined with user data, presentation information, and digital signatures. The embodiments described herein also manage non-repudiation of a system where language translations of the user interface occur.

Figure 3:
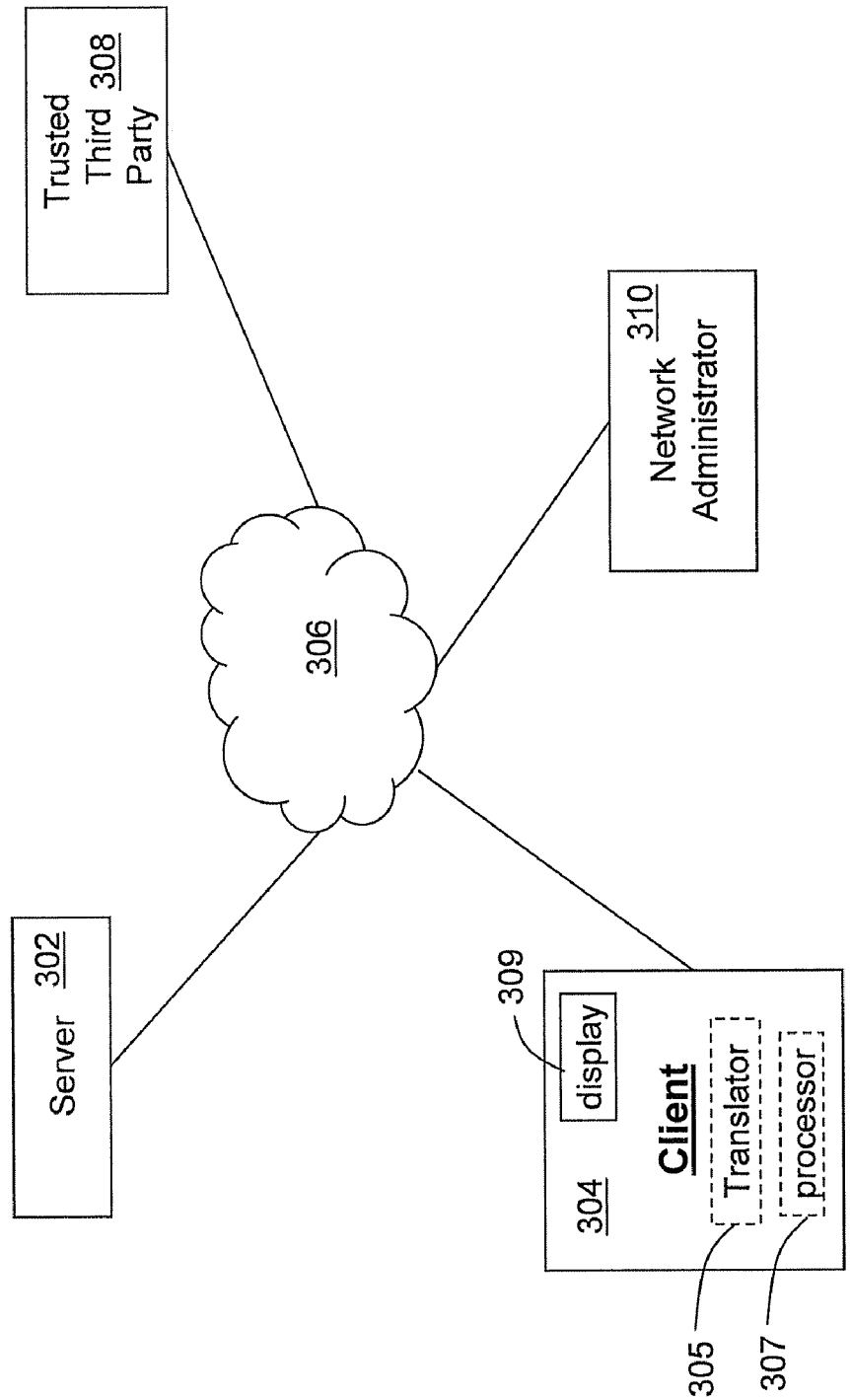
FIG. 3 is a block diagram of a system for digitally signing translated content in accordance with an embodiment of the present invention.

Referring to FIG. 3, an exemplary network environment or system 300 useful for distributing translated versions to clients and servers is illustrated. As shown in FIG. 3, a client 304, a server 302, a trusted third party 308 and a network administrator 310 are all interconnected over a network 306. When new layouts and translated user interfaces are to be distributed to forms users, a central authority, such as a network administrator 310 can send the signed revised layout to each of the clients and servers over the network. Each of the clients and servers can validate the signature of the revised layout originator using the services of a trusted third party 308 to ensure a valid public key. Once the revised layout has been authenticated and verified, it can be stored at the client and/or the server for use. Furthermore, the client (or server or other networked device) can translate the layout or user interface into alternative languages using the translator 305. Note that the translator 305 can reside in the recipient client 304 or another client, the server 302, the network administrator 310 or even the trusted third party 308. In other embodiments as contemplated herein, the "translator" can be a human translator interacting with various systems to provide language translation services for the user interface. A processor 307 in the client 304 (or elsewhere) can be used to perform many of the steps of the method 100 described above. As such, a system for applying digital signatures to translated content can include a presentation device such as a display 309 and a user interface presented on the presentation device. The system can further include at least one processor 307 that operates to perform some or all of the steps described with respect to method 100 including the steps of creating the user interface in a first language as part of an application, enabling the entering of data into the user interface and the digital signing of the data by a first user, translating the user interface to at least a second language, and presenting the data to at least a second user using the application. A recipient device can verify the digital signatures, where a verification of the digital signatures verifies a data signature, a user interface signature, and a translated user interface signature.

Referring to FIGS. 4-10 a more detailed break down of the elements of an embodiment of the present invention is illustrated. This embodiment is very similar to the embodiment of FIG. 1, but provides additional details for the various steps involved. Of particular note is that a source UI digest appears in every signature and ties all the signatures together. This common source UI digest will become more apparent with the discussion related to FIGS. 8-10 below.

Figure 4:
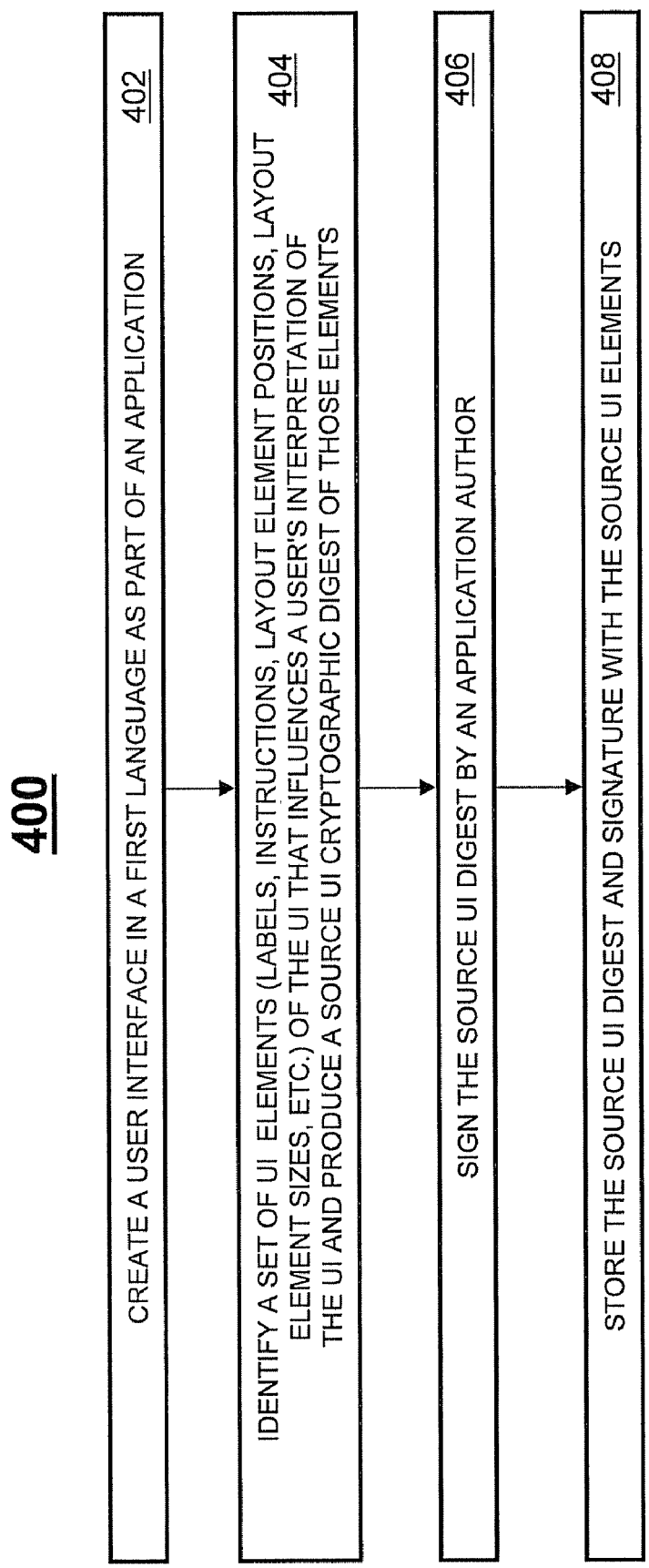
FIG. 4 is a flow chart illustrating a method of digitally signing an author source user interface in accordance with an embodiment of the present invention.

Referring to FIG. 4, a method of generating a source UI digest which is signed by an application author is shown. At step 402, a user interface is created in a first language as part of an application. At step 404, a set of UI elements are identified (labels, instructions, layout element positions, sizes, an so on) that influence a user's interpretation of the UI and a source UI cryptographic digest of those UI elements are produced. Then, the source UI digest is signed by an application author at step 406 and the source UI digest and signature with the source UI elements are then further stored at step 408.

Referring to FIG. 5, a method 500 translates source UI elements to produce translated UI elements and a new digest. More particularly, the method begins at step 502 by retrieving the source elements from storage and regenerating the source UI elements digest at step 504. The Source UI digest is compared to the new (regenerated) digest at step 506. The new digest is used to verify the source UI signature at step 508. At step 510, the identity of the source UI signer is compared to a list of known authorized users to verify the authority of the application UI author. At step 512, the UI elements are translated to another language by a second author. At step 514, a translated UI digest is generated that includes the elements of the translated UI and the source UI digest as input data. Then the translated UI digest is signed by the second author at step 516. At step 518, the translated UI elements with the source UI digest and the translated UI digest are stored.

Referring to FIG. 6, a method 600 begins by retrieving the source UI elements from storage at step 602. At step 604, the source UI elements digest is regenerated. Next, the stored source UI digest is compared to the new digest at step 606. The new digest is used to verifying the source UI signature at step 608. The method compares the identity of the source UI signer to a list of known authorized users to verify the authority of the application UI author at step 610. At step 612, the source UI is presented to a first user in the application and then data is entered at step 614 into the UI and the first user further digitally signs the data and the source UI digest. At step 616, the data signature and the source UI digest is stored.

Referring to FIG. 7, a method 700 of verifying the data in the translated UI is shown. At step 702, the translated UI elements digest is regenerated and at step 704 the stored translated UI digest is compared to the new (regenerated) digest. The new digest is used to verify the translated UI signature at step 706. At step 708, the identity of the translated UI signer is compared to a list of known authorized users to verify the authority of the translator. The method next regenerates the data digest using the data and source UI digest stored with the data at step 710. The stored data digest is compared to the newly generated data digest at step 712 and the data digest is used to verify the data signature at step 714. At step 716, the source UI digest stored with the data is compared source UI digest store with the translated UI elements.

Now with further reference to FIGS. 8-10, it should be emphasized that the source UI digest appears in every signature and ties all the signatures together. Referring to the chain of trust 800 for the source UI in FIG. 8, when the original UI is generated and signed, the UI elements 804 are digested, resulting in the Source UI Digest 808, which is stored with the UI. This is also the basis of the signature 802 that is applied to the source UI elements 804. Referring to the chain of trust 900 in FIG. 9, when the Source UI Elements are translated to produce the Translated UI Elements 904, a new digest 905 is created. This digest 905 includes the Translated UI Digest 909 and the Source UI Digest 808. The Source UI Digest 808 is also stored with the Translated UI Elements 904. This forms the translated UI signature 902.

When any version of the UI is displayed, and data is entered, the signature for that version of the UI can be verified to insure that the UI has not been tampered with, and optionally that it was created by an authorized user. Both of these aspects of non-repudiation are important, although most implementations would rely on access control to verify user authority, and would not require lists of authorized signers. Referring to FIG. 10 illustrating a chain of trust 950 for a translated UI, when a translated version of the UI with translated UI elements 904 is displayed, an optional additional authentication step can be taken to retrieve the Source UI, verify its signature, and compare the Source UI Digest 808 stored with the source and translated digest versions (812 and 953 respectively) of the UI. This verifies the connection to the Source UI Elements and helps to authenticate that the translation is valid.

When data entered into the UI is signed, it includes the SOURCE UI DIGEST 812 and, if the UI was a translated version, it includes the TRANSLATED UI DIGEST 953 as well. Both digests would be stored with the data 810. When a data signature 952 is verified, the SOURCE UI DIGEST 812 that is stored with the data 810 provides a link to the current UI (whatever version that might be), as every version of the UI contains the same SOURCE UI DIGEST linking the whole network back to the original UI elements.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A method of applying digital signatures to translated content, comprising the steps of:
   creating a first user interface in a first language as part of an application;
   entering data into the first user interface and digitally signing the data by a first user to create a first signature;
   translating the first user interface to a second user interface in at least a second language and digitally signing the second user interface to create a second signature;
   presenting the data to a second user in the application and verifying the signatures, wherein the second signature is independently verified from the first signature, wherein the steps of digitally signing the data and independently verifying the signatures provides non-repudiation of both the data entered by the first user and the first user interface translated to the second language; and
   verifying the first signature by:
      retrieving and re-digesting the data entered into the first user interface into a new digest, wherein the re-digested data includes a source user interface digest,
      comparing the new digest with a stored data digest,
      retrieving and re-digesting the first user interface to create a copy of the source user interface digest, and
      comparing the copy of the source user interface digest with a stored source user interface digest.

2. The method of claim 1, wherein the non-repudiation of both the data entered by the first user and the user interface occurs despite that the first user interface was translated to the second language and despite that a digital signature digest fails to directly include the first user interface in the first language.

3. The method of claim 1, wherein the step of translating the first user interface into the second language is performed before or after the application is deployed.

4. The method of claim 1, wherein digital signatures are verified in context of the second user interfaces that were deployed after the creation of digital signatures.

5. The method of claim 1, wherein the method further comprises the step of identifying a set of user interface elements of the first user interface that influences a user's interpretation of the first user interface and signing the set of user interface elements by an application author.

6. The method of claim 5, wherein the set of user interface elements comprises labels, instructions, layout element positions and layout element sizes.

7. The method of claim 5, wherein the step of signing the set of user interface elements comprises generating a cryptographic digest, storing the cryptographic digest, and applying a signature to the cryptographic digest.

8. The method of claim 5, wherein the set of user interface elements is translated into the second language and signed by the translator.

9. The method of claim 8, wherein a digest of the set of user interface elements in a set of translated user interface elements to provides traceability of the translation.

10. The method of claim 5, wherein the step of signing the set of user interface elements comprises generating a cryptographic digest of the second user interface, storing the cryptographic digest of the second user interface, and applying a digital signature to the cryptographic digest of the second user interface.

11. The method of claim 1, wherein the method further comprises the step of digesting the data entered into the first user interface, digesting user interface elements in a source language, and digesting the user interface elements in the second language to provide traceability of the user interface elements at the time of signing by the second user.

12. The method of claim 1, wherein the method further comprises the step of archiving all digests, signatures and copies of source elements for reference and wherein all signatures are independent of one another.

13. The method of claim 1, wherein if the user interface in use is a translated version of the first user interface, then re-digesting translated user interface elements into a new translated user interface digest where one of the translated user interface elements is a copy of the source user interface digest, comparing the new translated user interface digest to a stored translated user interface digest, using the new translated user interface digest to verify a translated user interface signature, and comparing the source user interface digest that is stored with the translated user interface digest to the new translated user interface digest.

14. The method of claim 13, wherein the digital signature is verified if the first signature, the second signature and a signature of the first user interface are all independently verified.

15. A system for applying digital signatures to translated content, comprising:
   a presentation device;
   a first user interface presented on the presentation device; and
   at least one processor operates to:
      create the first user interface in a first language as part of an application and digitally signing the first user interface to create a user interface signature;
      enable the entering of data into the first user interface and digitally signing the data by a first user to create a data signature;
      translate the first user interface to a second user interface in at least a second language and digitally signing the second user interface to create a translated user interface signature;
      present the data to at least a second user using the application; and
      verify the digital signatures, wherein a verification of the digital signatures verifies the data signature, the user interface signature, and the translated user interface signature, wherein the steps of digitally signing the data and independently verifying the signatures provides non-repudiation of both the data entered by the first user and the first user interface translated to the second language;
      verify the data signature by:
         retrieving and re-digesting the data entered into the first user interface into a new digest, wherein the re-digested data includes a source user interface digest, and
         comparing the new digest with a stored data digest; and
      verify the user interface signature by:
         retrieving and re-digesting the first user interface to create a copy of the source user interface digest, and comparing the copy of the source user interface digest with a stored source user interface digest.

16. The system of claim 15, wherein the at least one processor further operates to identify a set of user interface elements of the first user interface that influences a user's interpretation of the first user interface and signing the set of user interface elements by an application author and the step of signing the set of user interface elements comprises generating a cryptographic digest, storing the cryptographic digest, and applying a signature to the cryptographic digest.

17. The system of claim 15, wherein the system further comprises a content management system enabling archiving of all digests, signatures, and copies of source elements for later retrieval and versioning to facilitate revisions after initial system deployment.

18. A computer program embodied in a non-transitory computer storage medium and when operated in a data processing machine for applying digital signatures to translated content, comprising instructions which when executed by the data processing machine that cause the data processing machine to:
  create a first user interface in a first language as part of an application and digitally signing the first user interface to create a user interface signature;
  enable the entering of data into the first user interface and digitally signing the data by a first user to create a data signature;
  translate the first user interface to a second user interface in at least a second language and digitally signing the second user interface to create a translated user interface signature;
  present the data to at least a second user using the application; and
  verify the digital signatures, wherein a verification of the digital signatures verifies a data signature, a user interface signature, and a translated user interface signature, wherein the steps of digitally signing the data and independently verifying the signatures provides non-repudiation of both the data entered by the first user and the first user interface translated to the second language;
  verify the data signature by:
    retrieving and re-digesting the data entered into the first user interface into a new digest, wherein the re-digested data includes a source user interface digest, and
    comparing the new digest with a stored data digest; and
  verify the user interface signature by:
    retrieving and re-digesting the first user interface to create a copy of the source user interface digest, and
    comparing the copy of the source user interface digest with a stored source user interface digest.

* * * * *